United States Patent Office.

ROBERT S. STENTON, OF NEW YORK, N. Y.

Letters Patent No. 95,534, dated October 5, 1869.

IMPROVEMENT IN THE MANUFACTURE OF PIGMENTS FOR PAINTS.

The Schedule referred to in these Letters Patent and making part of the same.

*To whom it may concern:*

Be it known that I, ROBERT S. STENTON, of New York, in the county and State of New York, have invented certain new and useful Improvements in the Manufacture of Pigments for Paint; and I hereby declare the following to be a full, clear, and exact description of the same.

The nature of my invention consists—

First, in the use of the black magnetic oxide of iron, or other iron-ores of primitive formation, in contradistinction to the hematites or other later formations of iron-ore, for the manufacture of pigments, the same being used either alone or in combination with other materials, if expedient, for the purpose.

Second, in the use, either alone or in combination with other suitable substances for the manufacture of pigments, of iron or steel scales made in forges, nail-factories, rolling-mills, or other works where red-hot iron is manipulated, said scales being an oxide of iron formed by the combination of atmospheric oxygen, with the iron or steel in its heated condition, and thrown off by the action of the hammer, rolls, cutters, stamps, or other machinery.

The above-named substances, either in a roasted or a raw condition, may be resolved or reduced to the state required for their use as pigments, by any ordinary or suitable mode of manipulation, for instance, by crushing, grinding, and bolting, or by the same series of operations, and then floating the reduced substances in air or water, or by chasing, or by dissolving and precipitating the substances by means of chemical agents, or by any other methods known to the trade.

The pigments thus formed are not only of extreme cheapness, but they give a very fine and excellent paint.

The pigment produced by the crushing, grinding, and bolting, is well adapted for ordinary uses. When a very fine and smooth paint is required, the pigment procured from the precipitate of a solution of the ore in an acid bath—muriatic acid, for instance—is well adapted for the purpose.

What I claim as my invention, and desire to secure by Letters Patent, is—

1. The use of the aforesaid black magnetic oxide of iron-ore, or other primitive formations of iron-ore, either alone or in combination with other suitable substances, for the manufacture of pigments for paint, substantially as set forth.

2. The use, either alone or in conjunction with other suitable substances, for the manufacture of pigments for paint, of the aforesaid iron or steel scales, the same being an oxide of iron, produced substantially as herein set forth.

In testimony whereof, I have signed my name to this specification, before two subscribing witnesses.

R. S. STENTON.

Witnesses:
   A. POLLOK,
   GEORGE W. NELSON.